United States Patent
Doudement et al.

[11] Patent Number: 5,186,307
[45] Date of Patent: Feb. 16, 1993

[54] TRANSPORT DEVICE FOR REMOVING INTERLOCKED PREFORMS

[75] Inventors: Gerard Doudement, Le Havre; Alain Dulong, Yport, both of France

[73] Assignee: Sidel, Le Havre Cedex, France

[21] Appl. No.: 864,788

[22] Filed: Apr. 7, 1992

[30] Foreign Application Priority Data

Apr. 16, 1991 [FR] France .................. 91 04647

[51] Int. Cl.[5] ........................................... B65G 47/12
[52] U.S. Cl. .................... 198/454; 198/453; 209/707
[58] Field of Search ............ 193/46; 198/389, 398, 198/453, 454; 209/707, 616, 701

[56] References Cited

U.S. PATENT DOCUMENTS

| | | | |
|---|---|---|---|
| 2,813,616 | 11/1957 | Ferguson et al. | 198/398 X |
| 2,945,335 | 7/1960 | Nicolle | 193/46 X |
| 3,344,901 | 10/1967 | Schultz | 198/398 X |
| 4,182,030 | 1/1980 | Mullins | 198/389 X |
| 4,223,778 | 9/1980 | Kontz | 198/389 |
| 4,244,459 | 1/1981 | Garrett | 198/389 |

FOREIGN PATENT DOCUMENTS 377353 7/1990 European Pat. Off. .
867672 5/1961 United Kingdom .

*Primary Examiner*—Joseph E. Valenza
*Assistant Examiner*—Cheryl L. Gastineau
*Attorney, Agent, or Firm*—Sughrue, Mion, Zinn, Macpeak and Seas

[57] ABSTRACT

Preforms 1 for the manufacture of synthetic bottles are transported along a conveyor track 10 formed by two parallel slide-rails 11 arranged such that a perpendicular common to the two slide-rails is substantially horizontal. The preforms have heads 2 larger than their bodies 5, and are vertically supported between the two slide-rails by their heads. The conveyor track embodies unbalancing mechanism 14 in the form of a raised and arcuate rail section 15 for tilting interlocked preforms $6_1$, $6_2$ such that their center of gravity G is shifted outside of one of the slide-rails 11, whereby they become unbalanced and fall off the slide-rails. An extractor 17 formed by a pair of counter-rotating, bladed wheels 18 may also be provided, for grasping and lifting off vertically oriented interlocked preforms.

9 Claims, 3 Drawing Sheets

FIG.1.
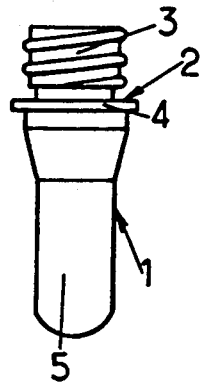
FIG.2.
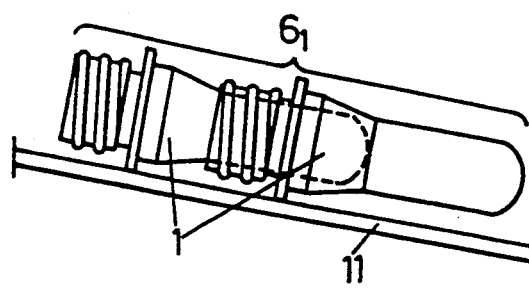
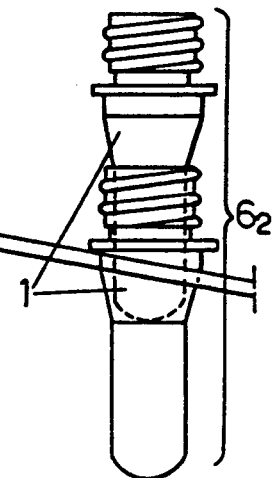
FIG.4
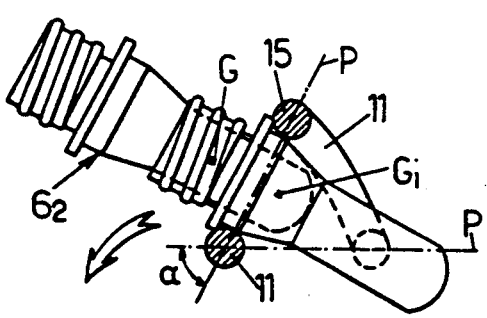
FIG.5.
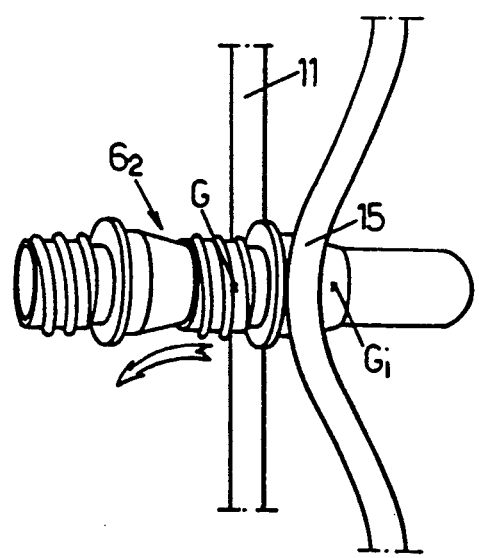

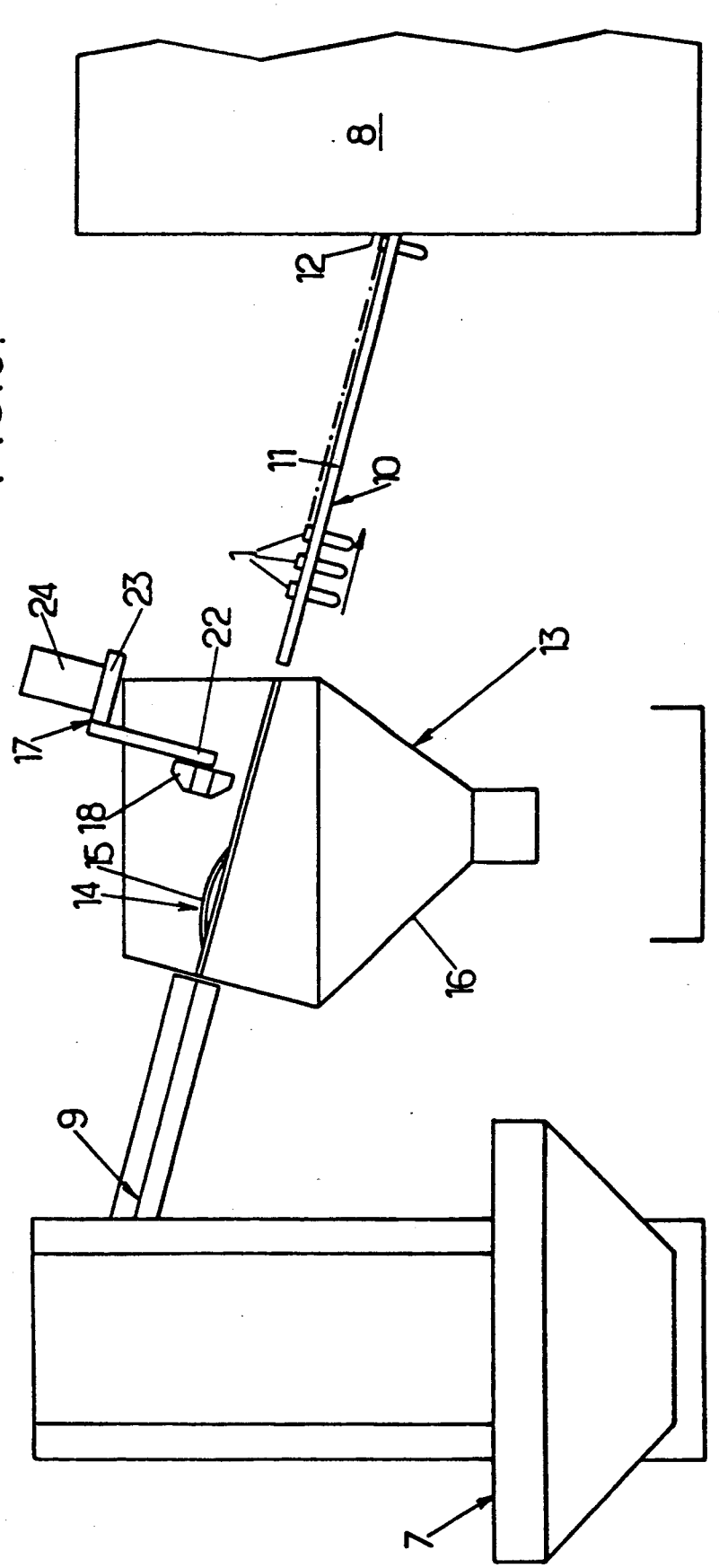

5,186,307

TRANSPORT DEVICE FOR REMOVING INTERLOCKED PREFORMS

BACKGROUND OF THE INVENTION

This invention generally relates to the manufacture of hollow containers made of synthetic materials, such as bottles, flasks, etc., by blow-molding or stretching-blowing of preforms, and more specifically to the feed of preforms to equipment used to manufacture the containers.

To manufacture certain types of containers, use may be made of preforms whose heads have a greater transverse dimension than their bodies. Because these preforms are initially bulk-loaded into a hopper, some of them, e.g., two, may become inserted into each other and, because of a wedging phenomenon, the means for feeding and positioning the preforms one by one on slide-tracks transporting the preforms to the container-manufacture machine are not capable of separating them. The interlocked preforms are thus transported on the conveyor slide-rails either in a vertical position, in which the lower preform rests on its head on the slide-rails in the same way as the separate preforms and is surmounted by the other interlocked preform or preforms, or in a horizontal position, in which the interlocked preforms lie flat on the slide-rails.

In any event, the interlocked preforms cannot be fed into the manufacturing machine. Vertically positioned interlocked preforms cannot reach the transfer apparatuses, since they exceed the size required for transport, while horizontally interlocked preforms cannot be grasped by the transfer apparatuses. As a result, the machine stops, thereby generating rejects and causing reduced production output. It is thus necessary to ensure that all of the preforms reaching the manufacturing machine are usable by the latter, by eliminating or rejecting the interlocked preforms before they reach the entrance to the machine.

SUMMARY OF THE INVENTION

A main object of the invention is thus to fit out all or a portion of the means used to transport the preforms to the entrance to the manufacturing machine, so that any interlocked preforms are removed prior to being fed into the machine. It is desirable to eliminate these preforms systematically and reliably, so as to increase the operating reliability of the container-manufacturing machine. It is also desirable that the means to implement this end be simple, inexpensive, and not bulky; that these means do not require extensive modification of the layouts for future equipment installations; and that, if possible, they be easily incorporated into existing equipment.

For these purposes, the invention proposes a preform-conveyor device designed for the manufacture of hollow bodies made of synthetic material, such as bottles or similar objects, said device comprising a conveyor track composed of two substantially parallel slide-rails which are arranged in such a way that a perpendicular line common to both slide-rails is substantially horizontal, said preforms having a head which is larger than their body and being engaged vertically between the two slide-rails on which they are transported while being supported by the head. The conveyor device of the invention basically comprises means for removing preforms inserted into each other. The removal means incorporate unbalancing means capable of shifting the center of gravity of the preforms, so that a vertical line passing through the center of gravity of a group of interlocked preforms passes to the outside of one of the slide rails; the group of interlocked preforms thus becomes unbalanced and falls off the slide-rails.

To preserve the overall design of the slide-rail structure widely used in this type of equipment, the means for unbalancing the interlocked preforms may incorporate a conveyor-track section in which the two slide-rails are mutually offset in such a way that their common perpendicular is inclined in relation to the horizontal by a value such that the groups of interlocked preforms become unbalanced.

In one simple embodiment, one of the slide rails is parallel to the axis of the conveyor track, while the other slide-rail has a section positioned at a height greater than that of the section facing the first slide-rail and connecting gradually with the sections located upstream and downstream from it.

To ensure that the arrangement according to the invention can affect the interlocked preforms both lying flat and in a vertical position on the slide-rails, the unbalancing means is preferably arranged so that the perpendicular common to both slide-rails is inclined by approximately 60° to the horizontal.

Although the unbalancing means described above can remove the interlocked preforms either lying flat or vertically positioned on the slide-rails, it happens in practice that, while they are totally effective in removing interlocked preforms which lie flat, they are not completely effective in removing interlocked preforms positioned vertically on the slide-rails. In fact, tests have shown that the effectiveness of the unbalancing means was complete when a group of vertical interlocked preforms was transported separately on the slide-rails. However, this case occurs rarely in practice, since the preforms are usually in contact with each other as they are transported, and there is the possibility that their collars, by which they rest on the slide-tracks, will overlap. The friction generated by the preforms in contact with each other and the overlapping of the collars may hinder the swinging motion of a group of interlocked preforms subjected to the action of the unbalancing means according to the invention.

It is thus useful to add to the unbalancing means by providing extraction means located longitudinally at a distance from the unbalancing means and above the conveyor track, at a height greater than that of the separate preforms travelling on the slide-rails, but lower than that of two interlocked preforms being transported in a vertical position on the slide-rails, said extraction means being arranged to grip interlocked preforms and extract them vertically by removing them from the conveyor track.

In a preferred embodiment, the extraction means comprises two counter-rotating wheels equipped with blades which are elastically deformable and reciprocally arranged so that one group of vertically-positioned interlocked preforms is grasped between the blades of the two counter-rotating wheels and drawn upwardly.

Although the extraction means can be positioned either upstream or downstream from the unbalancing means, it has been shown that the reliability of the unbalancing and extraction means, used in combination, can be less than total. In fact, when the extraction means are positioned first (upstream) in the direction of travel of the preforms, interlocked preforms lying flat on the slide-rails cannot be grasped by the extraction means positioned at a greater height above them. While continuing their travel on the slide-rails, these interlocked preforms lying flat on the slide-rails can swing into a vertical position, for example when subjected to shocks and vibrations, and thus enter the unbalancing apparatuses which, for the reasons indicated previously, can fail to remove the interlocked preforms, which thus reach the entrance to the manufacturing machine.

To overcome this difficulty and obtain total reliability in removing the interlocked preforms, the extraction means are preferably positioned downstream from the unbalancing means, in the direction of travel of the preforms.

From the preceding explanations, it will be easily understood that the means used in accordance with the invention are technologically simple. Accordingly, not only does the cost of the equipment remain moderate, but the equipment does not require extensive modification of the installation layouts and may thus be mounted on both new and existing equipment installations.

BRIEF DESCRIPTION OF THE DRAWINGS

FIG. 1 represents diagrammatically an embodiment of a preform of the kind covered by the invention.

FIG. 2 is a diagrammatic side view showing interlocked preforms positioned on conveyor slide-tracks in two different positions.

FIG. 3 is a diagram of the entire unit, illustrating a device according to the invention as installed in the equipment.

FIGS. 4 and 5 are end and top views, respectively, illustrating the unbalancing means of the device in FIG. 3, and in which the interlocked preforms are stacked in the vertical position during ejection.

DETAILED DESCRIPTION OF THE PREFERRED EMBODIMENTS

Figure 6:
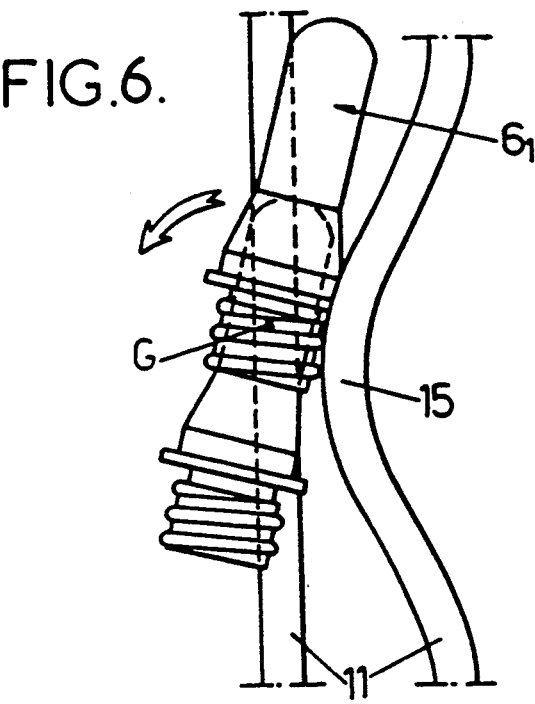
FIG. 6 is a top view of the same means, in which the preforms are stacked in a horizontal position while being ejected.

FIG. 1 illustrates an example of a preform according to the invention. This preform 1 has a head 2 composed of a neck 3 preliminarily shaped to the final form and dimensions of the neck of the final container (bottle, flask, etc.) and a large-diameter collar 4 which provides support for the handling operations carried out during manufacture. Beneath the head 2 extends a thick-walled body 5, which has, at least in the part opposite the neck, a transverse dimension (in particular a diameter) smaller than that of the head. As illustrated in FIG. 1, the body 5 may be attached to the head by a tapered or conical section.

These preforms, in which the bodies are narrower than the head, may accidentally become interlocked and wedged together as shown in FIG. 2, to form units of two or three (or more) preforms. This interlocking action may occur in particular when the preforms are stored in bulk in a hopper 7 used to feed a container-manufacturing machine 8 (see FIG. 3). The preforms are taken from the hopper 7 to an untangling machine 9 which transports them one by one in the vertical position, with the head at the top, to a conveyor track 10 incorporating inclined slide-rails 11 on which the preforms travel by means of gravity before reaching the entrance 12 to the machine 8.

FIG. 2 shows the two positions which can be taken by the groups of interlocked preforms travelling on the slide-rails 11:

group $6_1$ is lying flat or generally horizontally on the slide-rails and travels on them in this position;

group $6_2$ is in the vertical position. The lower preform rests by means of its head collar on the slide-rails in identical fashion to the separate preforms, while the other preform, which is fitted into the first, rises above it and overhangs the entire row of separate preforms.

To remove the interlocked preforms before they reach the entrance 12 to the container-manufacturing machine 8, a removal unit 13 is inserted in the conveyor apparatus incorporating the slide-rails.

The unit 13 comprises, first, unbalancing means 14 which can shift the center of gravity of the preforms and which takes advantage of the difference in the position of the center of gravity of the separate and interlocked preforms to retain the separate ones on the slide-rails and to cause only the interlocked preforms to swivel off the slide-rails.

One embodiment of the unbalancing means involves locally interrupting, i.e., over a short section, the parallelism of the two slide-rails 11 and arranging them in relation to each other so that they possess a transverse inclination $\alpha$ of at least 60° to the horizontal (see FIGS. 4 to 6). It will be noted, moreover, that it suffices that one of the two slide-rails (e.g., the slide-rail illustrated on the right in FIGS. 4 to 6) incorporate a deformation 15, while the other (the slide-rail on the left) may retain a normal longitudinal shape (e.g., rectilinear, as shown).

In the example illustrated more specifically in FIG. 4, the angle of inclination $\alpha$ of the perpendicular P common to both slide-rails 11, to the horizontal, is approximately 62°. However, the value of this inclination must, of course, be adjusted in each specific case as a function of the position of the center of gravity of the interlocked preforms.

FIGS. 4 and 5 are end and top views, respectively, of a group $6_2$ of two interlocked preforms which enter the device in the vertical position. $G_i$ designates the position of the center of gravity of a single preform. Given the position of the center of gravity in relation to the two slide-rails 11, the single inclined preforms remain in position between the slide-rails. G designates the center of gravity of the two interlocked preforms; a vertical line through this center of gravity extends outside of the slide-rails 11, and the tilted group $6_2$ of two preforms thus swings off the slide rails (to the left in FIGS. 4 and 5) and falls in a collection hopper 16.

FIG. 6 is a top view of a group $6_1$ of two interlocked preforms which enter the device lying flat on the slide-rails. Because of the position of the center of gravity $G_i$ of an individual preform, which is located beneath the collar 4 by means of which it rests on the slide-rail, the separate preforms cannot adopt a stable position in which they lie flat on the slide-rails, and they can only be positioned vertically between the two slide-rails. On the other hand, a group $6_1$ of two or more preforms can adopt a position in which they lie flat, resting on the slide-rails 11 by means of their spaced collars. When travelling past the deformation 15, the center of gravity G of the group of interlocked preforms is shifted, and the vertical of point G extends beyond the center of the left slide-rail (in FIG. 6). The group $6_1$ of interlocked preforms thus falls in the hopper 16.

The effectiveness of the unbalancing device just described is total as regards the ejection of groups $6_1$ of interlocked preforms lying flat (FIG. 6). On the other hand, in the case of groups $6_2$ of interlocked preforms in the vertical position (FIGS. 4 and 5), friction generated between successive preforms in contact with each other, and especially a potential overlapping of the collars of the preforms, can prevent the interlocked preforms from swiveling or tilting to a sufficient "ejection" degree when they pass through the device 14.

An extraction device 17 is therefore added which acts solely on vertical groups $6_2$ of interlocked preforms to remove them vertically from the slide-rails and to cause them to fall into the hopper 16. For the reasons indicated above, the extraction device 17 is preferably positioned downstream from the unbalancing apparatus 14, in order to achieve a totally effective removal of groups of interlocked preforms.

Figure 7:
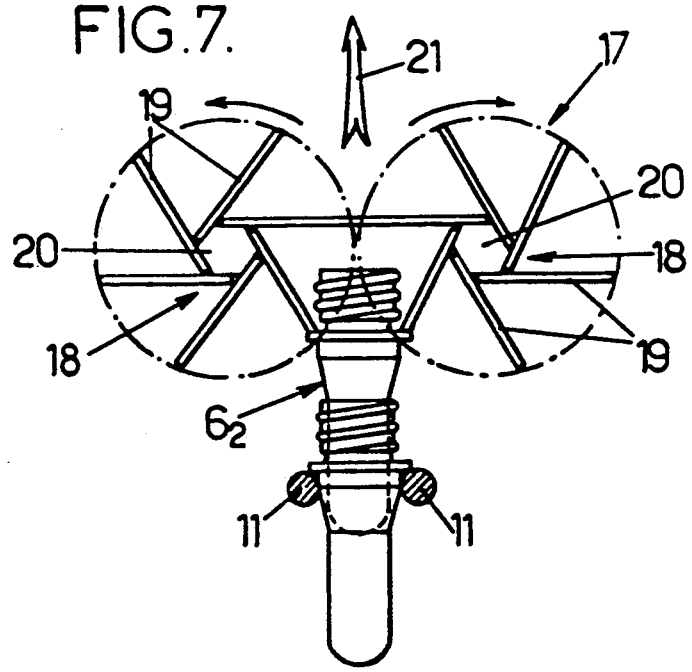
FIG. 7 is a schematic front view of the extraction means in FIG. 3, in which the preforms are stacked in the vertical position while being ejected.

As illustrated in FIG. 7, the extraction device 17 basically comprises two blade-equipped wheels 18 which turn in opposite directions (counter-rotating) and which are installed, transversely to the slide-rails 11, above the level of the heads of the single preforms, but below the level of the upper head of a group $6_2$ of two preforms. The blades 19 are attached to a shaft 20. The circular trajectories of the ends of the blades of the two wheels are approximately tangent, or very close together. Furthermore, the blades are made so as to be elastically deformable. The removal of the group of interlocked preforms is diagrammatically shown by the arrow 21 (FIG. 7).

The mounting and drive of the counter-rotating wheels 18 may be easily adapted to each instance of application by the skilled workman. For example, as shown in FIG. 3, the two wheels 18 are attached, in the position indicated above, to the lower ends of two support arms 22 connected to a frame 23, which supports an electric variable speed gear drive 24 connected to the hopper 16.

Dual motion delivery is created on the variable speed gear drive 24 by means of a dual direct-drive train of gears, and motion is individually transmitted to the shafts 20 by means of two belts, not shown.

As shown in FIG. 3, the apparatuses used in accordance with the invention for the total removal of interlocked preforms can be installed in the conveyor slide-rail device which feeds the manufacturing machine. The installation of these devices requires no substantial lengthening of the slide-rails. The devices are perfectly suited for equipping descending rectilinear slide-rails, as shown, on which the preforms travel by gravity; however, they can potentially be installed, if necessary, in all other configurations (e.g., horizontal and/or curved slide-rails). The use of these devices thus requires no modification of the plans provided for the construction of new equipment installations; furthermore, existing equipment can also be easily fitted with them. Finally, the cost of these devices remains minimal when compared with the production losses they prevent.

As is obvious and as emerges from the preceding description, the invention is in no way limited to the applications and embodiments which were more specifically considered; to the contrary, it encompasses all variants.

We claim:

1. A conveyor device for transporting preforms (1) intended for the manufacture of hollow bodies made of synthetic material, such as bottles, including a conveyor track (10) incorporating two, substantially parallel slide-rails (11) arranged such that a perpendicular (P) common to both slide-rails is substantially horizontal, said preforms each having a head (2) larger than at least one portion of a body (5) thereof and being engaged vertically between the slide-rails during transport while being supported by their heads, said device comprising: means (13) for removing undesirably interlocked preforms ($6_1$, $6_2$), said removal means comprising unbalancing means (14) for shifting a center of gravity (G) of the interlocked preforms such that a vertical line passing through the center of gravity of a group ($6_1$, $6_2$) of interlocked preforms lies outside of one of the slide-rails, such that said group of interlocked preforms becomes unbalanced and falls off the slide rails.

2. A conveyor device according to claim 1, wherein the unbalancing means comprises a section of the conveyor track in which the slide-rails are mutually offset, and the common perpendicular (P) is inclined in relation to the horizontal by an angular value ($\alpha$) such that groups of interlocked preforms become unbalanced.

3. A conveyor device according to claim 2, wherein a first one of the slide-rails is parallel to an axis of the conveyor track, while another, second one of the slide-rails defines an arcuate section (15) reaching a height greater than that of the first slide-rail and which progressively attaches to sections upstream and downstream therefrom.

4. A conveyor device according to claim 3, wherein said angular value is at least approximately 60°.

5. A conveyor device according to claim 1, wherein the means for removing interlocked preforms further comprises extraction means (17) disposed longitudinally spaced from the unbalancing means and above the conveyor track, at a height greater than that of single preforms travelling on the slide-rails, and lower than that of two interlocked preforms travelling in a vertical position on the slide-rails, said extraction means being arranged to grasp and carry interlocked preforms vertically off the conveyor track.

6. A conveyor device according to claim 5, wherein the extraction means comprises two counter-rotating wheels (18) fitted with elastically deformable blades (19) and arranged in combination so that a group of vertically-positioned interlocked preforms is grasped between the blades of the two counter-rotating wheels and carried upwardly (21).

7. A conveyor device according to claim 6, wherein the unbalancing means are located upstream from the extraction means, in the direction of travel of the preforms.

8. A conveyor device according to claim 7, wherein the conveyor track is inclined and wherein the preforms travel downwardly.

9. A conveyor device according to claim 8, wherein the means for removing interlocked preforms are located in a rectilinear part of the conveyor track.

* * * * *